(12) United States Patent
Smith

(10) Patent No.: US 6,984,036 B1
(45) Date of Patent: Jan. 10, 2006

(54) SAFETY SHIELD FOR EYEWEAR ASSEMBLY

(75) Inventor: Greg Smith, Plano, TX (US)

(73) Assignee: E'Lite Optik, Inc., Carrollton, TX (US)

( * ) Notice: Subject to any disclaimer, the term of this patent is extended or adjusted under 35 U.S.C. 154(b) by 30 days.

(21) Appl. No.: 10/897,814

(22) Filed: Jul. 24, 2004

(51) Int. Cl.
G02C 7/10 (2006.01)

(52) U.S. Cl. ............... 351/44; 351/47; 351/57; 2/13; 2/449

(58) Field of Classification Search ............. 351/41, 351/44, 47, 48, 57, 58; 2/13, 448–451
See application file for complete search history.

(56) References Cited

U.S. PATENT DOCUMENTS

| 5,543,864 A | 8/1996 | Hirschman et al. |
| 5,548,351 A | 8/1996 | Hirschman et al. |
| 5,748,278 A | 5/1998 | Simmons, Sr. |
| 6,270,216 B1 * | 8/2001 | DiChiara ............ 351/44 |
| 6,715,873 B2 * | 4/2004 | Nahmias ............ 351/44 |

* cited by examiner

*Primary Examiner*—Huy Mai

(57) ABSTRACT

An eyewear assembly comprises a primary lens assembly including a primary frame that secures a pair of primary lenses in position relative to one another. A pair of extensions is provided, each of the extensions positioned on an outer periphery of the primary frame. An arm is connected to each extension by a hinge. A safety shield is carried by the eyewear assembly and extends around a portion of the periphery of one of the primary lenses and extends longitudinally along one of the arms, wherein an open space between the primary lens, the arm, and an eye of the wearer is substantially enclosed. The safety shield has an aperture formed therein that extends from the primary lens rearward proximal the hinge, wherein the aperture is adapted to receive a portion of an auxiliary lens assembly.

15 Claims, 4 Drawing Sheets

SAFETY SHIELD FOR EYEWEAR ASSEMBLY

TECHNICAL FIELD OF INVENTION

The present invention relates to eyewear, and in particular, to a safety shield for eyewear. More particularly, the present invention relates to safety shields for eyewear that are capable of accommodating auxiliary lense assemblies, such as clip-on sunglasses.

BACKGROUND OF THE INVENTION

It has long been desirable to have a removable auxiliary lens assembly attached to eyeglasses. Professional baseball players have used "flip-up" auxiliary lenses for more than four decades to protect their eyes from the sun, but to allow them unrestricted vision in the event the ball was hit in their vicinity.

Furthermore, eyewear has been provided with removable (and fixed) safety shields that convert conventional prescription eyewear into safety glasses. Removable safety shields permit the wearer to avoid the inconvenience of wearing safety glasses over prescription eyewear. Examples of removable safety shields for use with conventional eyewear are found in U.S. Pat. No. 5,543,864, Aug. 6, 1996 to Hirschman et al.; U.S. Pat. No. 5,548,351, Aug. 20, 1996 to Hirschman et al.; and U.S. Pat. No. 5,748,278, May 5, 1998 to Simmons, Sr. All of these patents disclose variations on safety or side shields that can be removably attached to conventional eyewear, thus "con verting" the conventional eyewear into safety glasses.

None of these designs, however, permits the attachment of conventional auxiliary or "clip-on" or "flip-up" lenses to the eyewear in addition to the safety shield. Thus, if sunglasses are worn, the eyewear with safety shields must be removed and conventional safety glasses worn over the conventional sunglasses. Alternatively, two sets of these safety shields (one for prescription eyewear, one for sunglasses) could be employed.

A need exists, therefore, for safety shields for conventional eyewear that also permit the use of auxiliary lenses.

A primary advantage of the present invention is that it provides an eyewear assembly with safety shields that is adapted to receive auxiliary lens assemblies.

In accordance with one aspect of the invention, the eyewear assembly comprises a primary lens assembly including a primary frame that secures a pair of primary lenses in position relative to one another. A pair of extensions is provided, each of the extensions positioned on an outer periphery of the primary frame. An arm is connected to each extension by a hinge. A safety shield is carried by the eyewear assembly and extends around a portion of the periphery of one of the primary lenses and extends longitudinally along one of the arms, wherein an open space between the primary lens, the arm, and an eye of the wearer is substantially enclosed. The safety shield has an aperture formed therein that extends from the primary lens rearward proximal the hinge, wherein the aperture is adapted to receive a portion of an auxiliary lens assembly.

In accordance with one aspect of the invention, the safety shield is formed of transparent, rigid polymeric material.

In accordance with one aspect of the invention, a safety shield is associated with each primary lens and arm of the eyewear assembly.

In accordance with one aspect of the invention, the aperture is a rectangular notch that is open at an end proximal the primary lens.

In accordance with one aspect of the invention, the safety shield is secured to the eyewear assembly by sliding fit between a longitudinal channel in the safety shield and the arm and a screw between the channel and the arm.

In accordance with one aspect of the invention, the safety shield may be regarded as a separate accessory or as part of an eyewear assembly.

Other advantages of the present invention will become apparent from the following descriptions, taken in connection with the accompanying drawings, wherein, by way of illustration and example, an embodiment of the present invention is disclosed. As referred to hereinabove, the "present invention" refers to one or more embodiments of the present invention which may or may not be claimed, and such references are not intended to limit the language of the claims, or to be used to construe the claims in a limiting manner.

DETAILED DESCRIPTION OF THE INVENTION

Figure 1:
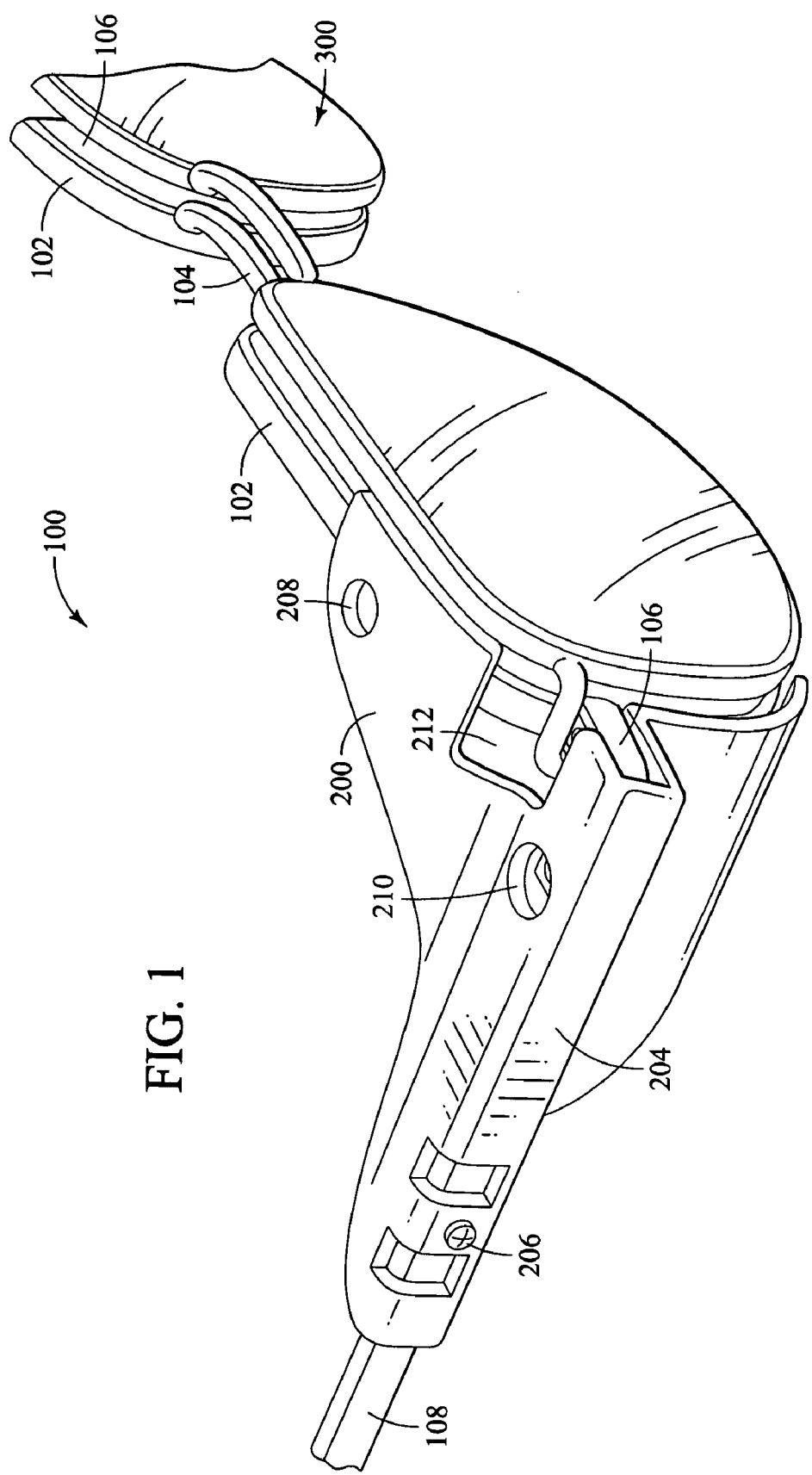
FIG. 1 is an isometric view of a portion of the eyewear assembly according to the preferred embodiment of the present invention.

Referring now to the FIGURES and particularly to FIG. 1, eyewear assembly 100 according to the present invention is shown. As illustrated in FIGS. 1 through 4, eyewear assembly 100 comprises a primary frame 102 that holds a pair of primary lenses, which may be protective lenses, corrective lenses, or colored lenses. A bridge 104 connects the right and left portions of primary frame 102. At the outer periphery of each lens, frame 102 has an extension 106.

An arm or temple 108 is connected by a hinge 110 to each extension. Each arm 108 terminates in an earpiece (shown in FIG. 3). Primary frame 102, bridge 104, and arms 108 cooperate to locate eyewear assembly 100 on the face of the wearer and to locate the lenses relative to one another and to the wearer's eyes.

A safety shield 200 according to the present invention is associated with each lens and arm 108 and serves to substantially enclose the space between the eye and face of the user and frame 102 and lenses, thus helping to prevent foreign objects from entering the space and damaging the eye or eyes of the wearer. Safety shield 200 preferably is formed of an impact resistant transparent plastic or polymer such as polycarbonate, which is sold by General Electric Corporation as Lexan.®

Figure 2:
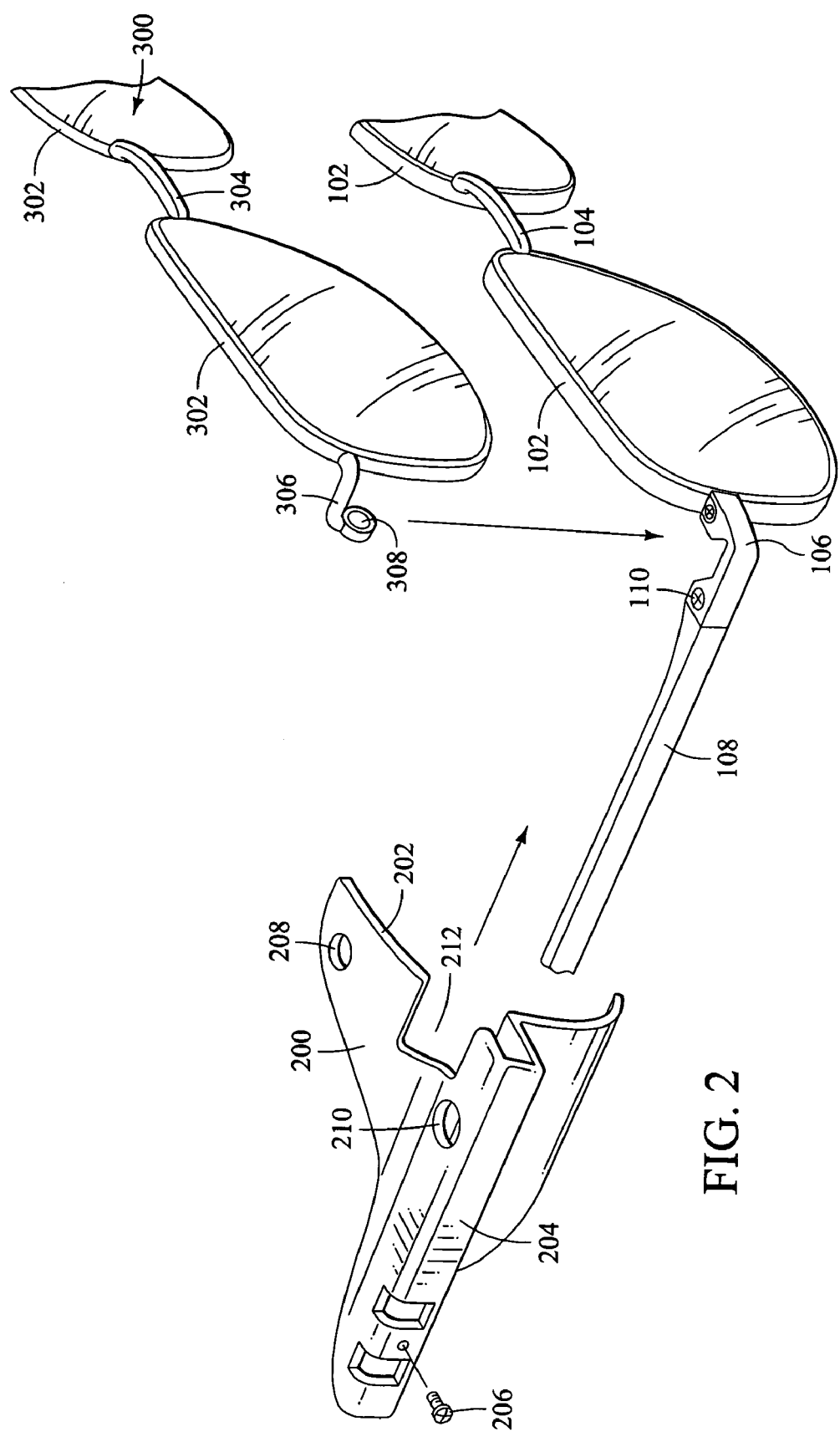
FIG. 2 is an exploded isometric view of the eyewear assembly of FIG. 1.
Figure 3:
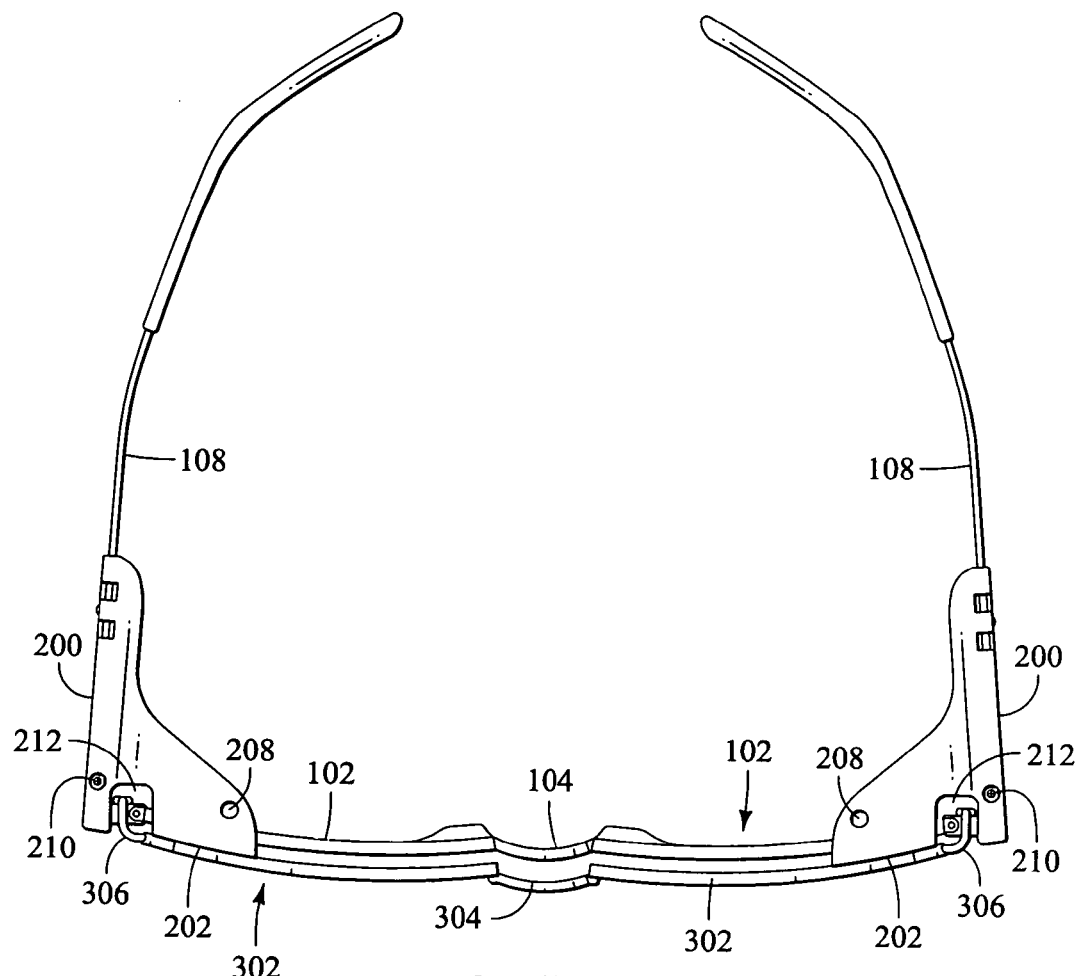
FIG. 3 is top plan view of the eyewear assembly according to the present invention.
Figure 4:
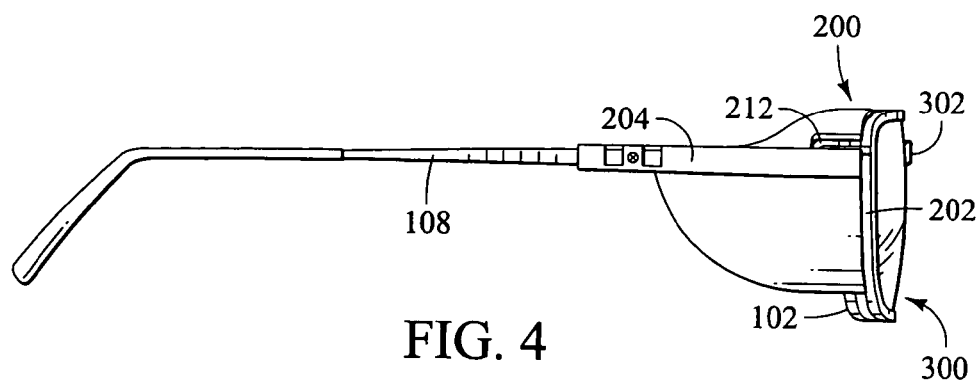
FIG. 4 is a side view of the eyewear assembly according to the present invention.

As is best depicted in FIGS. 1 and 2, safety shield has a forward edge 202 that is generally aligned with primary frame 102 and the lens and extends above and below extension 106, hinge 110, and arm 108 to enclose the outer periphery of frame 102. Safety shield 200 also extends rearwardly from frame 102 and lens along a portion of the length of arm 108. As shown in FIG. 3, a pair of safety shields 200 are provide for each lens and arm 108 pair. Each shield is substantially similar in construction, but must be manufactured in opposite or "mirror image" configurations to accommodate the right and left portions of frame 102.

Each shield 200 has a longitudinal channel 204 formed in it that receives arm 108 in a sliding relation. A screw 206 is provided to secure shield 200 from inadvertently sliding along arm 108. An aperture or hole 208 is provided at the upper extent of shield 200 to ventilate the space between the face and frame 102. Another aperture or hole 210 is provided near channel 204 to in a location to register with and permit access to the screw in hinge 110 of eyewear assembly 100 for tightening or repair as best shown in FIG. 3.

Eyewear assembly 100 according to the present invention, in addition to being provided with safety shields 200, is also adapted to be used with auxiliary lens assemblies 300. Such auxiliary lens assemblies 300 are designed to complement and extend the function of the primary lens assembly. For example, if the primary lenses are corrective, auxiliary lenses may be light-reducing ("sun glasses") or vice-versa. The auxiliary assembly may take the form of "clip-on" or "flip-up" lenses.

Figure 5:
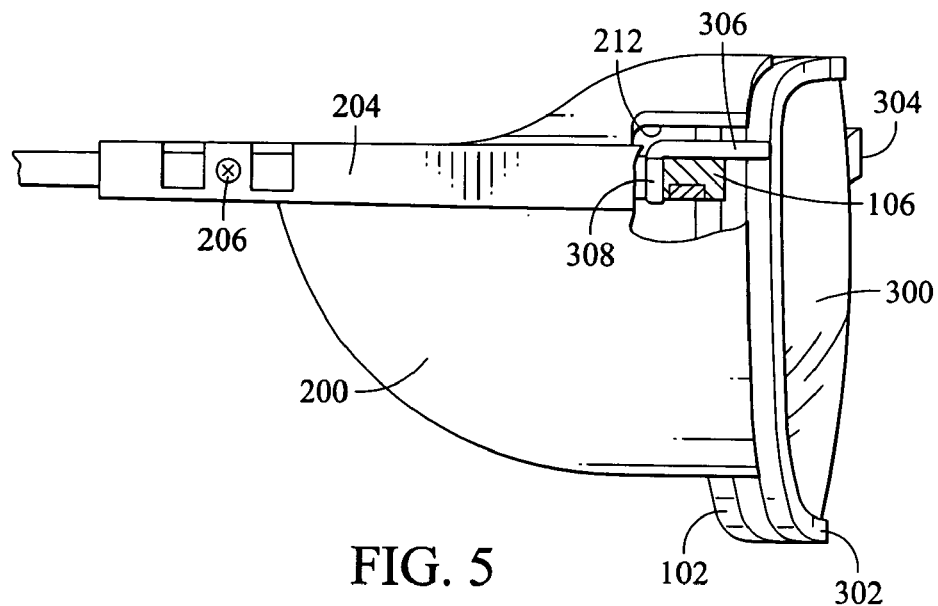
FIG. 5 is an enlarged side view of a portion of the eyewear assembly according to the present invention depicting the attachment of an auxiliary lens assembly.
Figure 6:
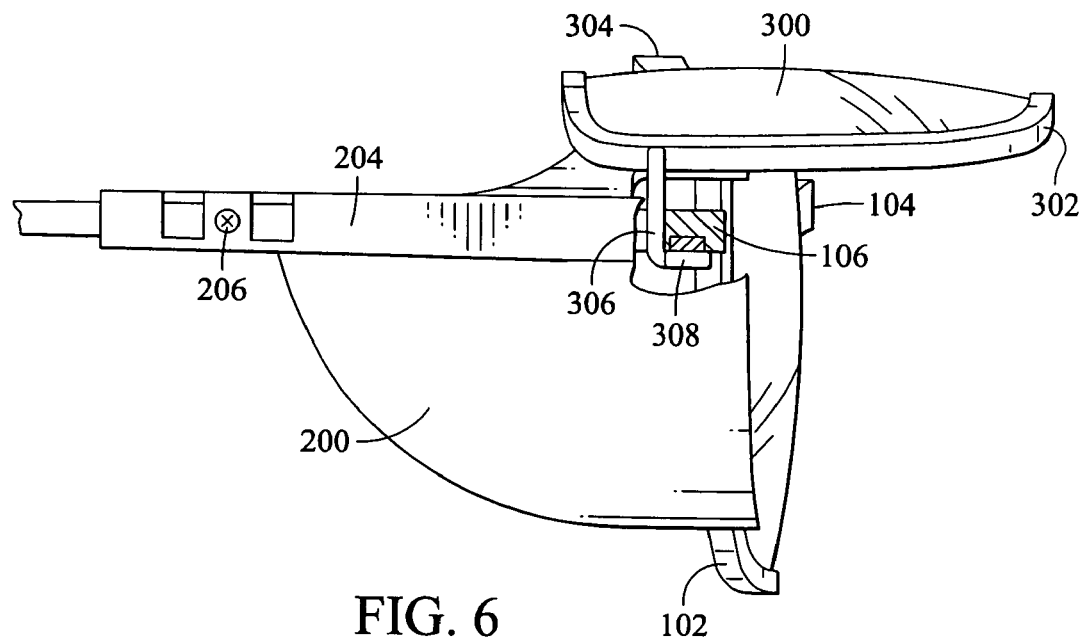
FIG. 6 is an enlarged side view of a portion of the eyewear assembly according to the present invention depicting the attachment of an auxiliary lens assembly in a configuration different from that illustrated in FIG. 5.

FIGS. 5 and 6 illustrate how safety shield 200 and primary frame 102 are adapted to use auxiliary lens assemblies 300. Auxiliary lens assembly 300 also comprises a frame 302, with each half associated with each lens being connected by a bridge 304. A lug or extension 306 extends from the outer periphery of each lens and frame half 302 for securing auxiliary lens assembly to primary frame 102.

As best shown in FIGS. 5 and 6, each extension 306 on auxiliary assembly 300 terminates in a magnetic disc member 308, which is arranged at a right angle to extension 306. This magnet 308 is attracted to either the ferromagnetic material of frame extension 106 or to a magnetic member secured to the rear or lower surface (or both) of extension 106 as shown in FIGS. 5 and 6. Thus, extension 306 and magnetic disk 308 secure auxiliary lens assembly 300 to primary frame 102 in either a conventional fashion as shown in FIG. 5 or in the "flip-up" configuration shown in FIG. 6.

It is possible to secure an auxiliary lens assembly 300 to primary frame 102 because of aperture 212 formed in safety shield 200. As depicted in all FIGURES, but particularly in FIGS. 1 and 2, a rectangular notch or aperture 212 is open at forward edge 202 of safety shield 200. It extends rearwardly proximal hinge extension 106 and hinge 110 to admit auxiliary extension 306 and magnetic member 308. Thus, auxiliary lens assembly 300 can be attached, removed, and moved between the conventional and "flip-up" configurations while safety shields 200 remain fixed in place. While an open rectangular notch is shown for aperture 212, any shape designed to accomplish the function of admitting structure past safety shield 200 and into engagement with a portion of primary frame 102 is within the contemplation of the present invention.

In operation, safety shields 200 are slid onto arms 108 from hinge or 106 backward toward the earpieces. They are secured to arms 108 by screws 212. Once shields 200 are secured, primary frame 102 can be used in situations requiring safety glasses. If the situation is outdoors or otherwise involves glare, an auxiliary frame and lens assembly 300 can be attached to primary frame 102 through aperture 212 and moved between various useful configurations. Safety shields 200 may be sold separately from other portions of eyewear assembly 100 or the entire assembly, including auxiliary lens assembly 300 sold as a unit.

The eyewear assembly and safety shield according to the present invention has a number of advantages. The principal advantage is that otherwise conventional eyewear can be quickly converted to safety glasses and retain their extended functionality with auxiliary lens assemblies. This saves cost to the eyewear purchaser and wearer and reduces the number of pairs of eyewear the wearer must account for.

The invention has been described with reference to a preferred embodiment thereof. It is thus not limited, but is susceptible to variation and modification without departing from the scope and spirit of the invention.

I claim:

1. An eyewear assembly comprising:
    a primary lens assembly including a primary frame that secures a pair of primary lenses in position relative to one another;
    an pair of extensions, each positioned on an outer periphery of the primary frame;
    a pair of arms, each connected to one of the extensions by a hinge;
    a safety shield carried by the eyewear assembly and extending around a portion of the periphery of one of the primary lenses and extending longitudinally along one of the arms, wherein an open space between the primary lens, the arm, and an eye of the wearer is substantially enclosed, the safety shield having an aperture formed therein and extending from the primary lens rearward proximal the hinge, wherein the aperture is adapted to receive a portion of an auxiliary lens assembly.

2. The eyewear assembly according to claim 1 wherein the safety shield is formed of transparent, rigid polymeric material.

3. The eyewear assembly according to claim 1, wherein a safety shield is associated with each primary lens and arm of the eyewear assembly.

4. The eyewear assembly according to claim 1, wherein the aperture is a rectangular notch that is open at an end proximal the primary lens.

5. The eyewear assembly according to claim 1, wherein the safety shield is secured to the eyewear assembly by sliding fit between a longitudinal channel in the safety shield and the arm and a screw between the channel and the arm.

6. An eyewear assembly comprising:
    a primary lens assembly including a primary frame that secures a pair of primary lenses in position relative to one another;
    an pair of extensions, each positioned on an outer periphery of the primary frame;
    a pair of arms, each connected to one of the extensions by a hinge;
    a safety shield having a forward edge extending around a portion of the periphery of one of the primary lenses above and below the hinge and arm and a rearward edge extending longitudinally along the arm, wherein an open space between the primary lens, the arm, and an eye of the wearer is substantially enclosed, the safety shield having an aperture formed therein proximal to the hinge that is adapted to receive a portion of an auxiliary lens assembly.

7. The eyewear assembly according to claim 6, wherein the safety shield is formed of transparent, rigid polymeric material.

8. The eyewear assembly according to claim 6, wherein a safety shield is associated with each primary lens.

9. The eyewear assembly according to claim 6, wherein the aperture is a rectangular notch that is open at the forward edge of the safety shield.

10. The eyewear assembly according to claim 6, wherein the safety shield is secured to the eyewear assembly by sliding fit between a longitudinal channel in the safety shield and the arm and a screw between the channel and the arm.

11. A safety shield for use with eyewear having a frame that secures a pair of primary lenses in position relative to one another and a pair of arms, each connected to the frame by a hinge, the safety shield comprising:

a forward edge extending around a portion of an outer periphery of the frame above and below the hinge and arm;

a rearward edge extending longitudinally along the arm, wherein an open space between the frame, arm, and an eye of the wearer is substantially enclosed; and an aperture formed in the safety shield proximal to the forward edge and the hinge that is adapted to receive a portion of an auxiliary lens assembly.

12. The eyewear assembly according to claim 11, wherein the safety shield is formed of transparent, rigid polymeric material.

13. The eyewear assembly according to claim 11, wherein a safety shield is associated with each lens and arm.

14. The eyewear assembly according to claim 11, wherein the aperture is a rectangular notch that is open at the forward edge of the safety shield.

15. The eyewear assembly according to claim 11, wherein the safety shield is removably secured to the assembly by interference fit between a longitudinal channel in the safety shield and the temple.

* * * * *